(12) United States Patent
Kanaya et al.

(10) Patent No.: US 7,784,273 B2
(45) Date of Patent: Aug. 31, 2010

(54) EXHAUST EMISSION PURIFYING APPARATUS FOR ENGINE

(75) Inventors: Isamu Kanaya, Ageo (JP); Koutarou Honda, Ageo (JP); Tomoko Amemiya, Ageo (JP); Kiminobu Hirata, Ageo (JP); Nobuhiko Masaki, Ageo (JP); Shinya Obana, Ageo (JP); Daisuke Shirai, Yokohama (JP); Hitoshi Hiramoto, Yokohama (JP); Naobumi Yamada, Yokohama (JP)

(73) Assignees: Nissan Diesel Motor Co., Ltd., Ageo-Shi (JP); Tokyo Roki Co., Ltd., Yokohama-Shi (JP)

( * ) Notice: Subject to any disclaimer, the term of this patent is extended or adjusted under 35 U.S.C. 154(b) by 616 days.

(21) Appl. No.: 11/643,710

(22) Filed: Dec. 22, 2006

(65) Prior Publication Data

US 2007/0101703 A1 May 10, 2007

Related U.S. Application Data

(63) Continuation of application No. PCT/JP2005/012994, filed on Jul. 14, 2005.

(30) Foreign Application Priority Data

Jul. 16, 2004 (JP) ............................. 2004-210353
Aug. 31, 2004 (JP) ............................. 2004-251470

(51) Int. Cl.
*F01N 3/00* (2006.01)
(52) U.S. Cl. .............................. 60/286; 60/295; 60/303; 60/324
(58) Field of Classification Search ................... 60/286, 60/295, 297, 301, 303, 324
See application file for complete search history.

(56) References Cited

U.S. PATENT DOCUMENTS

| 5,489,153 | A |   | 2/1996 | Berner et al. |
| 5,542,249 | A | * | 8/1996 | Heath ........................... 60/293 |
| 5,916,134 | A |   | 6/1999 | Yang et al. |
| 6,367,320 | B1 | * | 4/2002 | Kueper et al. ............. 73/114.71 |
| 6,401,455 | B1 | * | 6/2002 | Mathes et al. ................. 60/286 |
| 6,449,947 | B1 | * | 9/2002 | Liu et al. ....................... 60/286 |

(Continued)

FOREIGN PATENT DOCUMENTS

DE      100 60 808 A1    7/2002

(Continued)

*Primary Examiner*—Binh Q Tran
(74) *Attorney, Agent, or Firm*—McDermott Will & Emery LLP

(57) ABSTRACT

An exhaust emission purifying apparatus has a NOx reduction catalytic converter in an exhaust passage of an engine, for purifying nitrogen oxides in the exhaust gas by reduction with urea aqueous solution; an injection nozzle injecting the urea solution toward an exhaust upstream side of the converter in the exhaust passage; and fins disposed on an exhaust upstream side of an injection position of the urea solution in the injection nozzle, for generating a spiral swirling flow of the gas swirling about a center corresponding to the central axis of an exhaust pipe. The swirling flow generated in the exhaust gas prior to the injection-supply of the urea aqueous solution promotes mixing of the solution with the gas to thereby promote the hydrolysis of the urea solution. And the exhaust gas and ammonia generated from the urea solution are uniformly mixed together.

5 Claims, 13 Drawing Sheets

U.S. PATENT DOCUMENTS 7,059,118 B2 * 6/2006 Ripper et al. .................. 60/286
7,497,076 B2 * 3/2009 Funk et al. .................... 60/286

FOREIGN PATENT DOCUMENTS

| | | |
|---|---|---|
| EP | 0615777 | 9/1994 |
| EP | 0918146 | 5/1999 |
| JP | 06-210135 | 8/1994 |
| JP | 6-69319 | 9/1994 |
| JP | 11-166410 | 6/1999 |
| JP | 11-324664 | 11/1999 |
| JP | 2001-020724 | 1/2001 |
| JP | 2002-147226 | 5/2002 |
| JP | 2003-193823 | 7/2003 |
| JP | 2003 232218 A | 8/2003 |

* cited by examiner

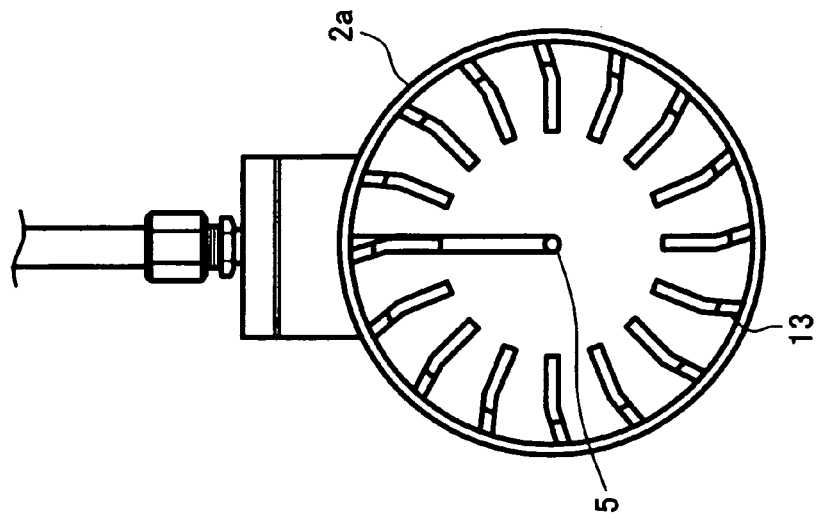
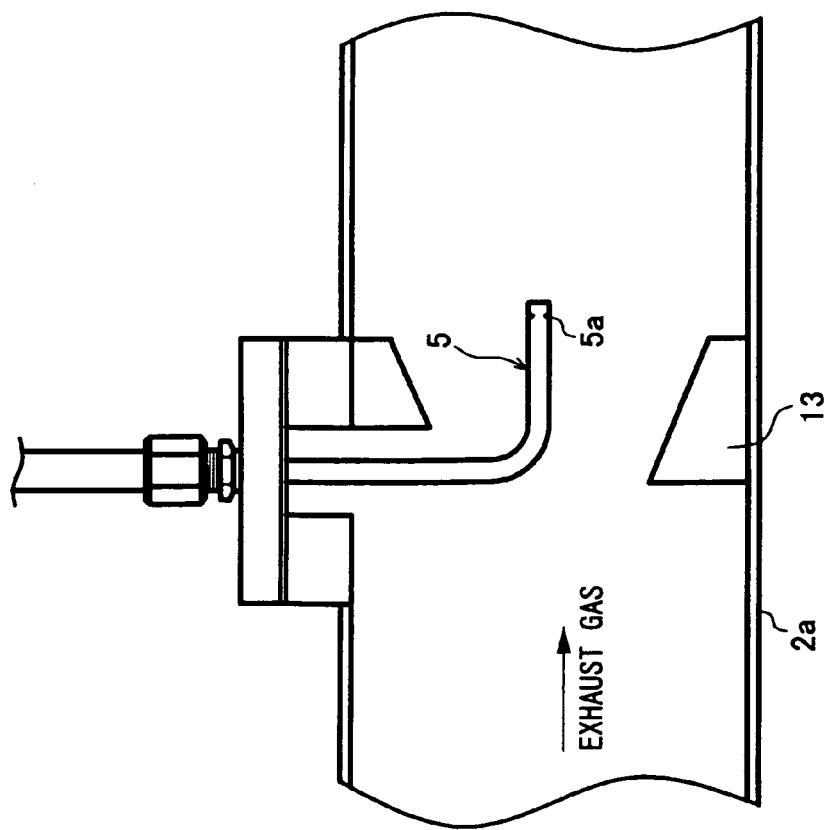

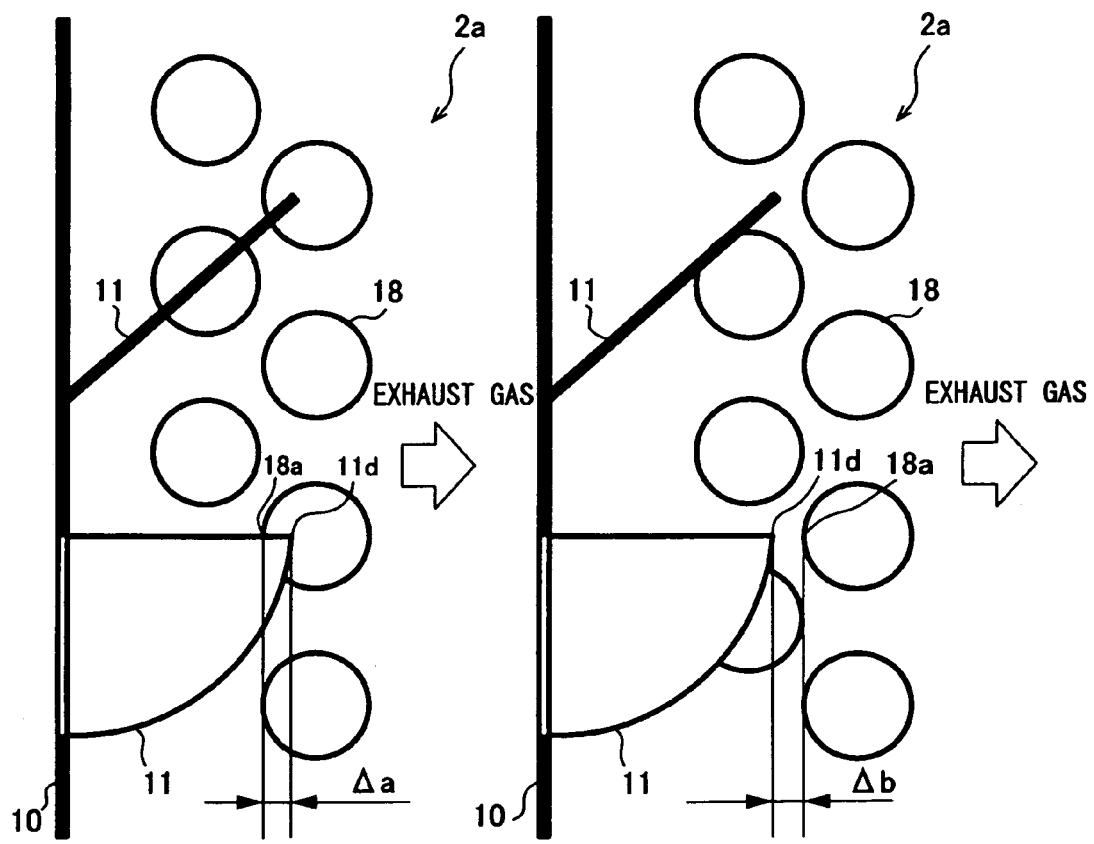

EXHAUST EMISSION PURIFYING APPARATUS FOR ENGINE

This application is a continuation of PCT/JP2005/012994, filed on Jul. 14, 2005.

BACKGROUND OF THE INVENTION

1. Field of the Invention

The present invention relates to an exhaust emission purifying apparatus for purifying an exhaust gas from an engine by eliminating nitrogen oxides ($NO_x$) in the exhaust gas by reduction using a reducing agent, and in particular, to an exhaust emission purifying apparatus for an engine, that is provided with a swirling flow generating means disposed in an exhaust passage for generating a swirling flow of the exhaust gas in order to increase efficiency in purifying of the exhaust gas.

2. Description of the Related Art

As a catalytic purifying system of eliminating $NO_x$ contained in the exhaust gas of an engine, there has conventionally been proposed an exhaust emission purifying apparatus. In such a conventional exhaust emission purifying apparatus, a $NO_x$ reduction catalytic converter is disposed in an exhaust passage of the engine, and a reducing agent such as a urea aqueous solution or the like, is injected from an injection nozzle disposed on an exhaust upstream side of the $NO_x$ reduction catalytic converter, so that the exhaust gas and the reducing agent are mixed with each other, and $NO_x$ in the exhaust gas and the reducing agent are subjected to the catalytic reduction-reaction to each other in the $NO_x$ reduction catalytic converter, so that $NO_x$ is purified into harmless components (refer to Japanese Unexamined Patent Publication No. 2001-20724).

However, in the above conventional exhaust emission purifying apparatus, there might be a possibility that the mixing of the reducing agent with the exhaust gas is insufficient, when injection of the reducing agent is carried out at a position located on the exhaust upstream side of the $NO_x$ reduction catalytic converter. Then, if the mixing of the reducing agent with the exhaust gas is insufficient as described above, the reducing agent non-uniformly flows into the $NO_x$ reduction catalytic converter, and as a result, there might be a possibility that the exhaust gas purification efficiency is lowered.

SUMMARY OF THE INVENTION

Therefore, in view of the above conventional problems, an object of the present invention is to provide an exhaust emission purifying apparatus for an engine, that is provided with a swirl-flow generating means disposed in an exhaust passage for generating the swirl-flow of the exhaust gas, so that an efficiency in purifying of the exhaust gas may be enhanced.

In order to achieve the above object, there is provided an exhaust emission purifying apparatus for an engine according to a first aspect of the present invention, which is configured by including a reduction catalytic converter disposed in an exhaust passage of the engine, for purifying nitrogen oxides in the exhaust gas by reduction with a reducing agent, an injection nozzle for injection-supplying the reducing agent at a position in the exhaust passage on an exhaust upstream side of the reduction catalytic converter; and a swirl-flow generating means disposed on an exhaust upstream side of an injection position of the reducing agent in the injection nozzle, for generating a swirling flow of the exhaust gas spirally swirling about a center corresponding to a central axis of the exhaust passage.

Preferably, the above-mentioned swirl-flow generating means comprised of a plurality of fins which is provided in the exhaust passage in a manner such that the fins extend, respectively, while defining a predetermined angle with respect to a linear direction in which the exhaust gas generally flows from the exhaust upstream side toward an exhaust downstream side.

Further preferably, the respective fins are formed in a thin plate of a shape substantially the same as a cross section of the exhaust passage by firstly providing mechanical cuts in the surface of the thin plate to define a corresponding number of fin-forming portions and by subsequently pulling up the fin-forming portions from the surface of the thin plate to obtain a desired raised position of the fins.

Furthermore preferably, the fins are arranged at least one of two positions, namely, an outer peripheral face of the injection nozzle extending toward an exhaust downstream side along the approximate center axis of the exhaust passage, and an inner peripheral face of the exhaust passage.

Still further preferably, the exhaust passage is formed to be separable in a plane orthogonal to the exhaust gas flow on the exhaust upstream side of the injection nozzle, and the fins are formed, by pulling up portions of a gasket which are defined by cuts given to the gasket interposed between flanges which connect separated portions of the exhaust passage to each other.

Moreover, the reduction catalytic converter is preferably formed to have a diameter larger than the cross section of the exhaust passage on the exhaust upstream side thereof, and the exhaust passage is formed such that an edge portion thereof is expanded in a bell-mouth shape increasing a diameter thereof toward the exhaust downstream side, at an exhaust gas inlet portion to the reduction catalytic converter.

Furthermore preferably, the reduction catalytic converter is formed to have a diameter thereof larger than that of the cross section of the exhaust passage on the exhaust upstream side thereof, and the exhaust passage is formed such that at least a part thereof between the injection nozzle and the reduction catalytic converter has the diameter expanded to form a substantially tapered shape toward the exhaust downstream side.

Further, an exhaust emission purifying apparatus for an engine according to a second aspect of the present invention, is configured to include a reduction catalytic converter disposed in an exhaust passage of the engine, for purifying nitrogen oxides in an engine exhaust gas by reduction with a reducing agent; an injection nozzle for injection-supplying the reducing agent at a position in the exhaust passage on an exhaust upstream side of the reduction catalytic converter; a partition plate disposed on an exhaust upstream side of the injection nozzle to traverse the exhaust passage, which is provided with, on a center portion thereof, a swirl-flow generating means for generating a swirling flow of the exhaust gas, which spirally swirls in at least a portion of the exhaust gas passing through the exhaust passage, and is provided with discharge holes which are formed in scattered manner in a peripheral region of the swirl-flow generating means, for permitting the exhaust gas to flow from an upstream side to a downstream side via the discharge holes; and a coupling exhaust pipe constituting a part of the exhaust passage, which is jointed to the partition plate while incorporating the swirl-flow generating means therein, the coupling exhaust pipe being formed with, on a side face thereof in the vicinity of the swirl-flow generating means, exhaust gas introduction holes for introducing the exhaust gas flowing out from the discharge holes of the partition plate into the coupling exhaust pipe.

Preferably, the swirl-flow generating means of the partition plate is comprised of a plurality of fins which is formed, by making a plurality of cuts so that a side extending in radial from a center portion of the partition plate becomes a folding line, and by folding an outer edge portion of each of the cuts toward the exhaust downstream at a predetermined angle, thereby generating, the swirling flow of the exhaust gas which spirally swirls.

Further, an exhaust upstream side end portion of each of the exhaust gas introduction holes of the coupling exhaust pipe is formed to be positioned on the exhaust upstream side to a tip end portion of each of the fins of the swirl-flow generating means.

According to the exhaust emission purifying apparatus of the first aspect, the swirling flow of the exhaust gas which spirally swirls about the center corresponding to the central axis of the exhaust passage, is generated in the exhaust gas of the engine by the swirl-flow generating means. Then, since the reducing agent is injection-supplied from the injection nozzle to the exhaust gas in which the swirling flow is generated, the mixing of the reducing agent with the exhaust gas is promoted. As a result, the exhaust gas with which the reducing agent is substantially uniformly mixed, flows into the reduction catalytic converter, and therefore, the exhaust gas purification efficiency in the reduction catalytic converter can be increased.

Further, since the swirl-flow generating means is disposed on the exhaust upstream side of the injection position of the reducing agent which is injected from the injection nozzle, no reducing agent injection-supplied from the injection nozzle attaches to the swirl-flow generating means. As a result, no component of the reducing agent deposits to the swirl-flow generating means.

According to an embodiment of the apparatus of the first aspect, since the exhaust gas passes past the respective angularly extending fins, the direction of flow of the exhaust gas is changed, so that the swirling flow can be generated in the exhaust gas.

According to a further embodiment of the apparatus of the first aspect, it is possible to easily produce the fins. In particular, the apparatus in which the fins are formed in the gasket, it is possible to easily generate the swirling flow in the exhaust gas only by modifying the gasket.

According to a still further embodiment of the apparatus in which the exhaust passage is formed such that an edge portion thereof is expanded in a bell-mouth shape, the exhaust gas in which the swirl-flow is generated, flows into the reduction catalytic converter formed with the diameter larger than that of the cross section of the exhaust passage on the exhaust upstream side, while being diffused along the inner peripheral face of the exhaust passage whose diameter is expanded in the bell-mouth shape. As a result, since the exhaust gas is rapidly diffused and flows into the reduction catalytic converter substantially uniformly, efficiency in purifying the exhaust gas in the reduction catalytic converter can be increased.

According to a further embodiment of the apparatus in which the reduction catalytic converter is formed to have a diameter thereof larger than that of the cross section of the exhaust passage on the exhaust upstream side thereof, and the exhaust passage is formed such that at least a part thereof between the injection nozzle and the reduction catalytic converter has the diameter expanded to form a substantially tapered shape toward the exhaust downstream side, the exhaust gas in which the swirling flow is generated, is diffused outward in a radial direction of the exhaust passage while being swirled along the inner peripheral face of the exhaust passage, when passing through the exhaust passage formed such that at least the part thereof between the injection nozzle and the reduction catalytic converter has the diameter expanded to form the substantially tapered shape. As a result, since the exhaust gas is sufficiently diffused in the exhaust passage and allowed to flow into the reduction catalytic converter substantially uniformly, it is able to enhance efficiency in purifying the exhaust gas in the reduction catalytic converter.

According to the exhaust emission purifying apparatus of the second aspect, the swirl-flow generating means is formed on the center portion of the partition plate disposed on the exhaust upstream side of the injection nozzle to traverse the exhaust passage, to thereby generate the swirling flow of the exhaust gas which spirally swirls. Further, the discharge holes are formed in scattered in the peripheral region of the swirl-flow generating means on the partition plate, and also, the exhaust gas introduction holes are formed on the side face of the coupling exhaust pipe which constitutes the part of the exhaust passage, so that a part of the exhaust gas is introduced into the vicinity of the swirl-flow generating means via the discharge holes and the exhaust gas introduction holes. As a result, it is possible to promote the mixing of the reducing agent injection-supplied from the injection nozzle with the exhaust gas by the swirling flow in the exhaust gas, to thereby improve the exhaust gas purification efficiency, and also it is possible to suppress the concentration of the exhaust gas at the swirl-flow generating means, to thereby reduce the resistance of the exhaust gas.

Further, according to an embodiment of the apparatus of the second aspect in which the swirl-flow generating means of the partition plate is comprised of a plurality of fins which is formed, by making a plurality of cuts so that a side extending in radial from a center portion of the partition plate becomes a folding line, and by folding an outer edge portion of each of the cuts toward the exhaust downstream at a predetermined angle, thereby generating, the swirling flow of the exhaust gas which spirally swirls, the plurality of fins is formed, by making each cut so that the side extending in radial from the center portion of the partition plate becomes the folding line, and by folding the outer edge portion of the cut toward the exhaust downstream at the predetermined angle. As a result, it is possible to generate the swirling flow in the exhaust gas which spirally swirls, by means of a simple configuration.

According to a further embodiment of the apparatus of the second aspect in which an exhaust upstream side end portion of each of the exhaust gas introduction holes of the coupling exhaust pipe is formed to be positioned on the exhaust upstream side to a tip end portion of each of the fins of the swirl-flow generating means, each of the exhaust gas introduction holes of the coupling exhaust pipe is formed so that the exhaust upstream side end portion thereof is positioned on the exhaust upstream side to the tip end portion of each fin of the swirl-flow generating means. As a result, it is possible to maintain the swirling flow in the exhaust gas. Consequently, it is possible to further promote the mixing of the reducing agent with the exhaust gas, to thereby further increase efficiency in purifying the exhaust gas.

BRIEF DESCRIPTION OF THE DRAWINGS

FIG. 5 is a structural diagram showing a still further embodiment of the fin shape, in which 5A is a front view and 5B is a side view;

FIG. 12 is an explanatory diagram showing positional relations between a fin tip end and an exhaust upstream side end portion of an exhaust gas introduction hole in the above embodiment.

DESCRIPTION OF THE PREFERRED EMBODIMENTS

Hereunder, there will be described embodiments of the present invention based on the accompanying drawings.

Figure 1:
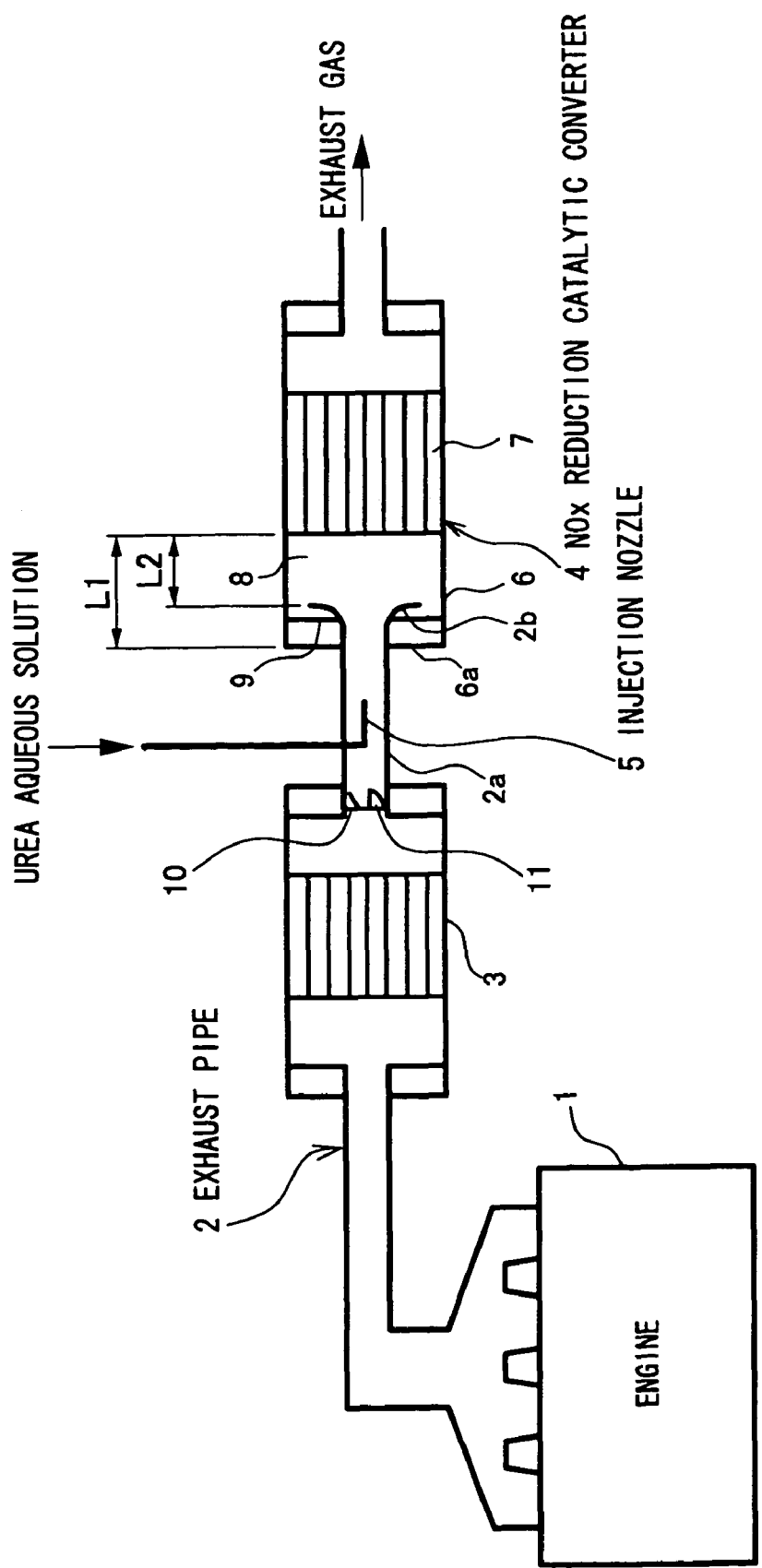
FIG. 1 is a schematic configuration diagram showing a first embodiment of an exhaust emission purifying apparatus for an engine according to a first aspect of the present invention.

FIG. 1 is a schematic configuration diagram showing a first embodiment of an exhaust emission purifying apparatus for an engine according to a first aspect of the present invention. This exhaust emission purifying apparatus is for reductively eliminating nitrogen oxides (NOx) in the exhaust gas by using a reducing agent, and comprises: a reduction catalytic converter disposed in an exhaust passage of the engine, for reductively purifying nitrogen oxides in the exhaust gas with the reducing agent; an injection nozzle for injection-supplying the reducing agent to an exhaust upstream side of the reduction catalytic converter in the exhaust passage; and swirl-flow generating means disposed on an exhaust upstream side of an injection position of the reducing agent injected from the injection nozzle, for generating the swirling flow of the exhaust gas which spirally swirls about the center thereof corresponding to the center axis of the exhaust passage.

In an exhaust pipe 2 serving as the exhaust passage of an engine 1, there are disposed an oxidation catalytic converter 3 for oxidizing nitrogen monoxide in the exhaust gas into nitrogen dioxide and a $NO_x$ reduction catalytic converter 4 for reductively purifying $NO_x$, in this order from an exhaust upstream side. Further, in an exhaust pipe 2a between the oxidation catalytic converter 3 and the reduction catalytic converter 4, there is disposed an injection nozzle 5 for injection-supplying a urea aqueous solution as the reducing agent into the exhaust pipe 2a. To the injection nozzle 5, the urea aqueous solution is supplied according to engine operating conditions. Incidentally, in the present embodiment, the urea aqueous solution is used as the reducing agent, but an ammonia aqueous solution, diesel oil containing hydrocarbon as a main component thereof or the like may be used.

In the NOx reduction catalytic converter 4, a catalyst carrier 7 which supports a zeolitic active component for example, is incorporated in a substantially cylindrical case 6 which is formed to have a diameter larger than that of the exhaust pipe 2a. The catalyst carrier 7 is disposed to be separated from an exhaust upstream side edge portion 6a of the case 6 by a first predetermined interval L1. Accordingly, in the case 6, a space 8 is formed on an exhaust upstream side of the catalyst carrier 7. The exhaust pipe 2a of which edge portion 2b serving as an exhaust gas inlet portion is opened is inserted into an approximate center of the exhaust upstream side edge portion 6a of the case 6. The exhaust pipe 2a is arranged such that the edge portion 2b thereof is separated from the catalyst carrier 7 by a second predetermined interval L2, and also the vicinity of the edge portion 2b is fixed to the case 6 by means of a fixing plate 9. Further, a diameter of an inner peripheral face of the edge portion 2b is expanded in a bell-mouth shape toward an exhaust downstream side. Note, the second predetermined interval L2 is appropriately set based on the specification of the engine 1, an inner diameter of the exhaust pipe 2a, an inner diameter of the case 6 and the like. The first predetermined interval L1 may be set to be slightly wider than the second predetermined interval L2 so that the edge portion 2b formed in the bell-mouth shape is arranged in the case 6.

Figure 2:
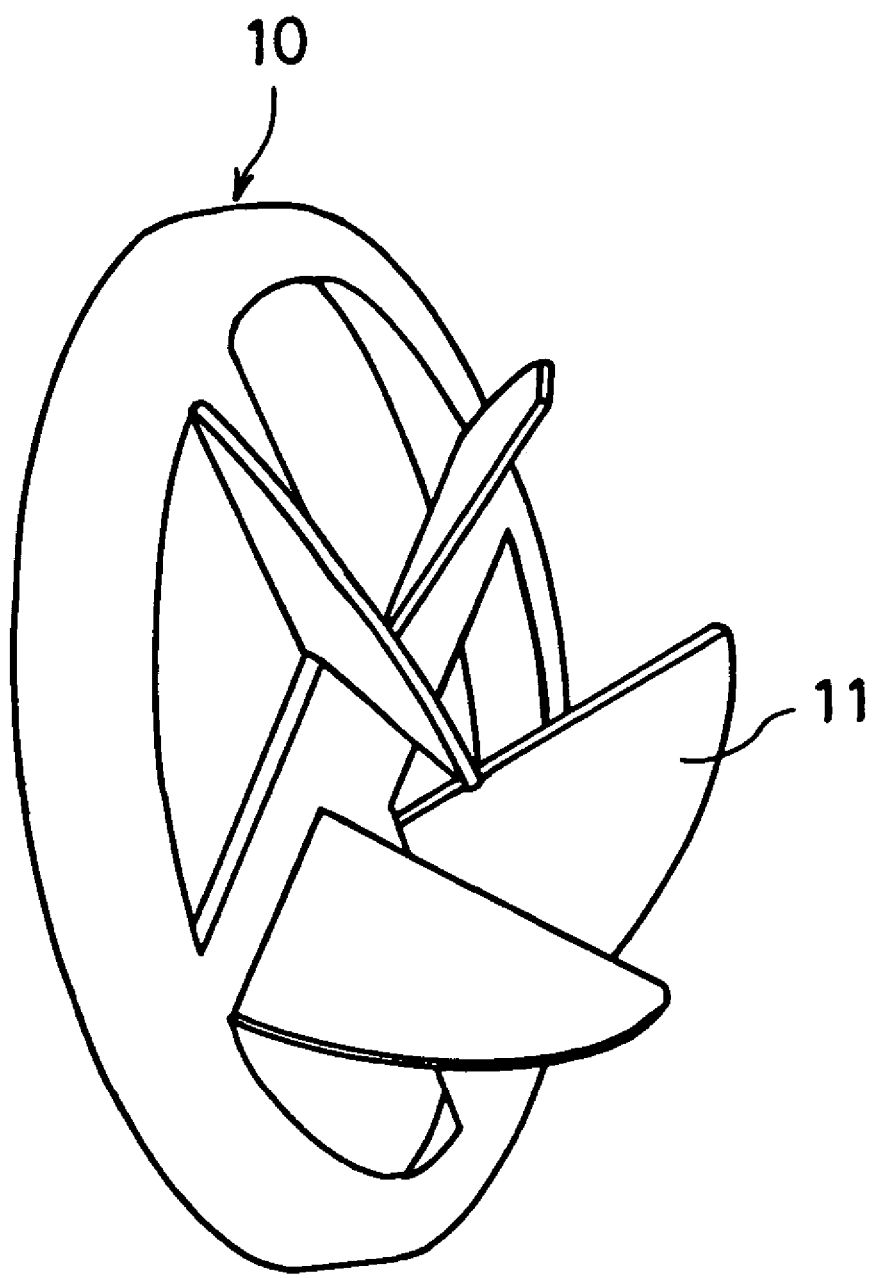
FIG. 2 is a perspective view showing a configuration example of a partition plate applied to the above embodiment.

On an exhaust upstream side of the injection nozzle 5 in the exhaust pipe 2a, swirl-flow generating means for generating, in the exhaust gas, the swirling flow which spirally swirls about the center thereof corresponding to the center axis of the exhaust pipe 2a, is disposed on a partition plate 10. As shown in FIG. 2, on the partition plate 10, a plurality of fins 11 serving as the swirl-flow generating means, which extends to a flow direction of the exhaust gas at a predetermined angle, is formed, by pulling up cuts which are mechanically given to a thin plate having a shape substantially same as a cross section of the exhaust pipe 2a. The number, angle and the like of each fin 11 is appropriately set based on the specification of the engine 1, the inner diameter of the exhaust pipe 2a, the inner diameter of the case 6 and the like.

According to the above configuration, the exhaust gas of the engine 1 passes through the fins 11, and generates therein the swirling flow which spirally swirls about the center thereof corresponding to the center axis of the exhaust pipe 2a. Then, to the exhaust gas in which the swirling flow is generated, the amount of the urea aqueous solution corresponding to the operating conditions of the engine 1 is injection-supplied from the injection nozzle 5. The urea aqueous solution injected from the injection nozzle 5 is hydrolyzed due to the exhaust heat and the water vapor in the exhaust gas, to generate ammonia. Generated ammonia and the exhaust gas are flowed into the $NO_x$ reduction catalytic converter 4 while being mixed with each other. Then, in the $NO_x$ reduction catalytic converter, ammonia and $NO_x$ in the exhaust gas are reacted to each other, so that $NO_x$ in the exhaust gas is purified into water and a harmless gas.

At this stage, the exhaust gas of the engine 1 passes through the oxidation catalytic converter 3, so that nitrogen monoxide in the exhaust gas is oxidized into nitrogen dioxide. As a result, a rate of nitrogen monoxide in the exhaust gas is decreased, and a ratio between nitrogen monoxide and nitrogen dioxide in the exhaust gas approaches an optimum ratio for the purification in the $NO_x$ reduction catalytic converter 4. Therefore, the exhaust gas purification efficiency in the $NO_x$ reduction catalytic converter 4 is improved.

Further, the swirling flow is generated in the exhaust gas by the partition plate 10 and the fins 11, and the urea aqueous solution is injection-supplied to the exhaust gas in which the swirling flow is generated, so that the mixing of the urea aqueous solution with the exhaust gas is promoted. As a result, the hydrolysis of the urea aqueous solution is promoted, and also, the exhaust gas and ammonia generated from the urea aqueous solution are substantially uniformly mixed with each other. Further, since the diameter of the edge portion 2b of the exhaust pipe 2a is expanded in the bell-mouth shape, the exhaust gas in which the swirling flow is generated is flowed into the space 8 from the edge portion 2b while being diffused along the inner peripheral face of the exhaust pipe 2a in the bell-mouth shape, to be rapidly diffused in the space 8. As a result, the exhaust gas with which the ammonia is mixed substantially uniformly is flowed into the catalyst carrier 7 of the $NO_x$ reduction catalytic converter 4. Therefore, the exhaust gas purification efficiency in the $NO_x$ reduction catalytic converter 4 can be improved.

Furthermore, since the partition plate 10 is disposed on the exhaust upstream side of the injection nozzle 5, no urea aqueous solution injection-supplied from the injection nozzle attaches to the partition plate 10. As a result, no urea which is a component of the urea aqueous solution deposits on the partition plate 10.

Figure 3A:
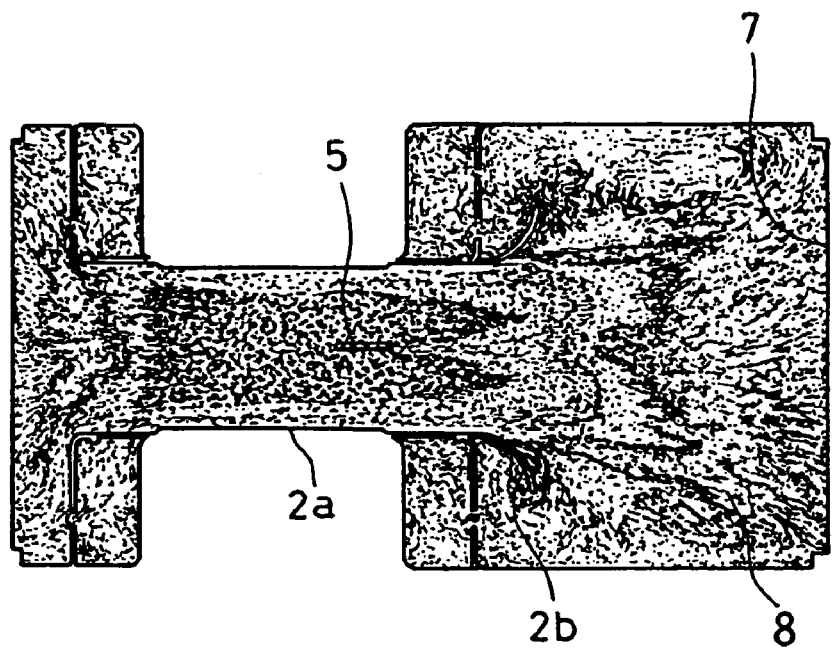
FIG. 3 is a diagram showing the exhaust gas flow in an exhaust pipe and in the space in the above embodiment, in which 3A is an explanatory diagram for when the partition plate is not disposed, and 3B is an explanatory diagram for when the partition plate is disposed.
Figure 3B:
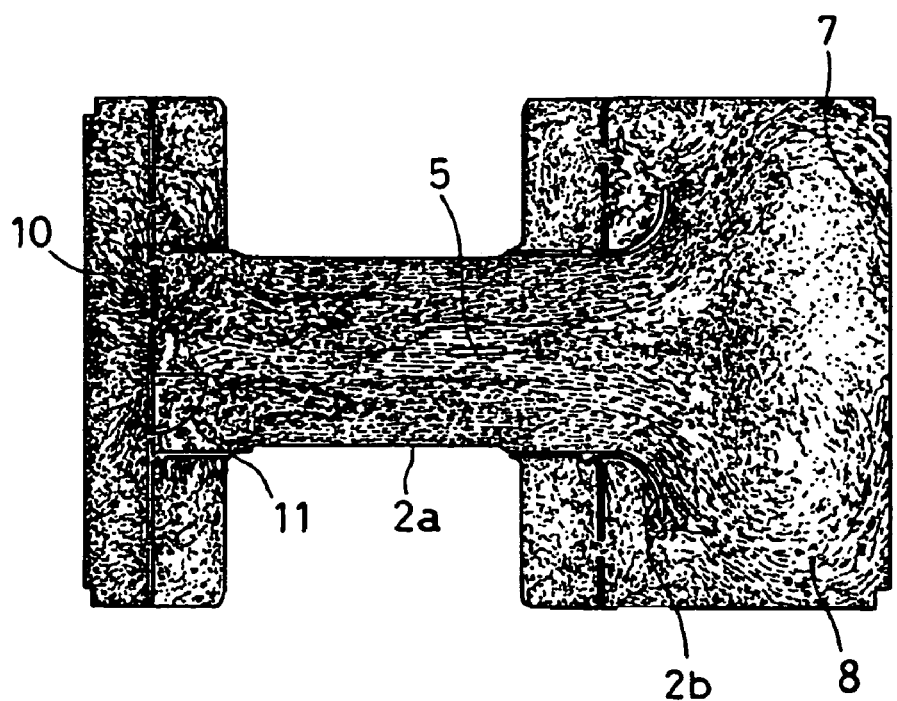

FIG. 3 is a diagram simulating the flow of the exhaust gas in the exhaust pipe 2a and in the space 8, provided that the edge portion 2b is formed in the bell-mouth shape. FIG. 3A shows the flow of the exhaust gas for when the partition plate 10 is not disposed on the exhaust upstream of the injection nozzle 5, while FIG. 3B showing the flow of the exhaust gas for when the partition plate 10 is disposed on the exhaust upstream of the injection nozzle 5. It is possible to understand from this figure that, provided that the edge portion 2b is formed in the bell-mouth shape, when the partition plate 10 is disposed, the exhaust gas is more diffused in the space 8 to be flowed into the catalyst carrier 7 substantially uniformly.

Figure 4:
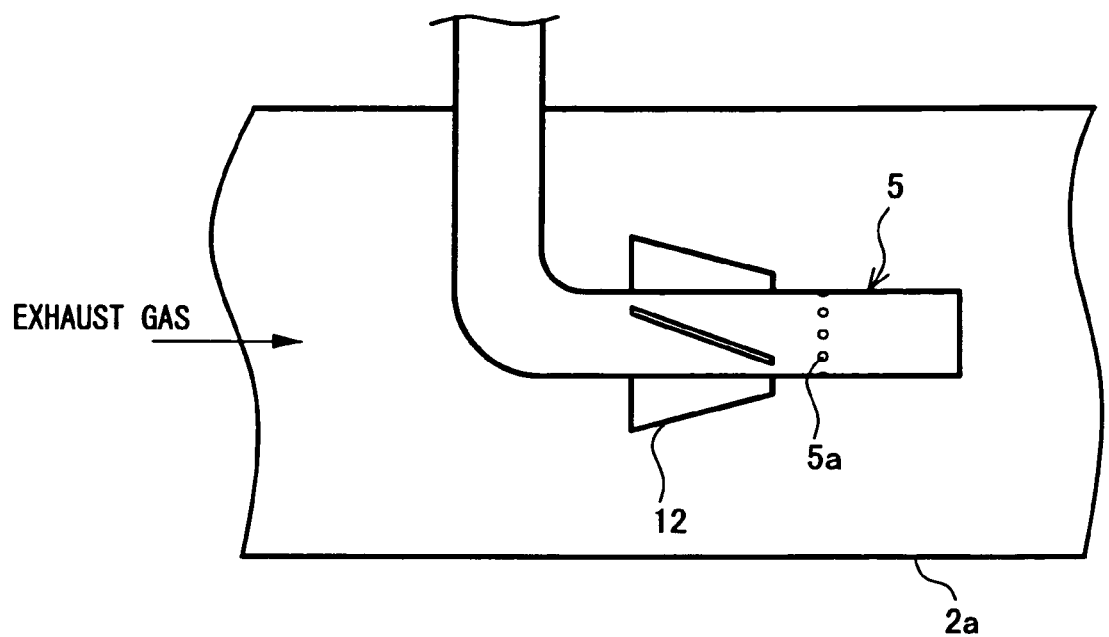
FIG. 4 is a structural diagram showing another embodiment of a fin shape.

Incidentally, in place of the partition plate 10, as shown in FIG. 4, a plurality of fins 12 extending at a predetermined angle with respect to the flow direction of the exhaust gas may be disposed, as the swirling flow generating means, on an outer peripheral face of the injection nozzle 5 which extends toward the exhaust downstream side along the approximate center axis of the exhaust pipe 2a, and on an exhaust upstream side of a nozzle hole 5a which injects the urea aqueous solution. Further, as shown in FIG. 5, a plurality of fins 13 extending at a predetermined angle with respect to the flow direction of the exhaust gas may be disposed, as the swirling flow generating means, on an inner peripheral face of the exhaust pipe 2a, and on the exhaust upstream side of the nozzle hole 5a. As a result, since the swirling flow is generated in the exhaust gas prior to the injection-supply of the urea aqueous solution, similarly to the case where the partition plate 10 and the fins 11 are disposed, the same effect can be achieved. Moreover, the fins 12 are disposed on the outer peripheral face of the injection nozzle 5 which extends toward the exhaust downstream side along the approximate center axis of the exhaust pipe 2a, and also, the fins 13 are disposed on the inner peripheral face of the exhaust pipe 2a, so that the stronger swirling flow can be generated, to thereby further promote the mixing of the urea aqueous solution with the exhaust gas.

Figure 6:
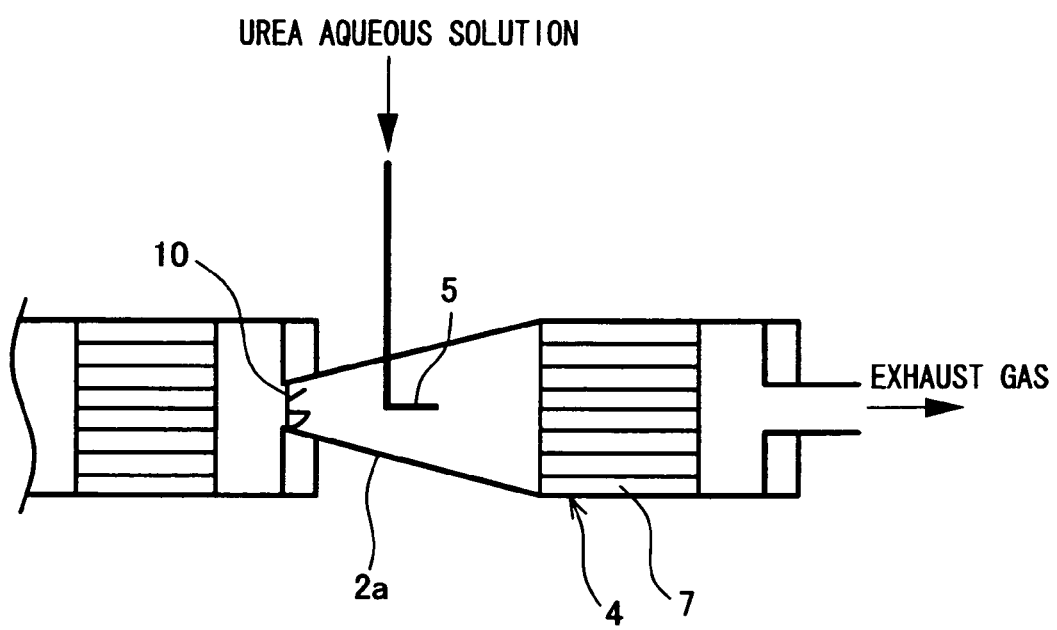
FIG. 6 is a structural diagram showing another embodiment of an exhaust pipe shape.

Furthermore, as shown in FIG. 6, the diameter of the exhaust pipe 2a may be expanded, toward the exhaust downstream side, to form a substantially tapered shape for a range between the partition plate 10 and the $NO_x$ reduction catalytic converter 4, until it becomes substantially same as a diameter of the $NO_x$ reduction catalytic converter 4. The exhaust gas in which the swirling flow is generated is diffused outward in a radial direction of the exhaust pipe 2a while being swirled along the inner peripheral face of the exhaust pipe 2a, when passing through the exhaust pipe 2a whose diameter is expanded to form the tapered shape. As a result, the exhaust gas is sufficiently diffused in the exhaust pipe 2a to be flowed into the catalyst carrier 7 substantially in even, and therefore, the exhaust gas purification efficiency in the $NO_x$ reduction catalytic converter 4 can be improved. At this stage, if the diameter of the exhaust pipe 2a is expanded to form a substantially tapered shape toward the exhaust downstream side at least at a part between the injection nozzle 5 and the $NO_x$ reduction catalytic converter 4, the same effect can be achieved. Further, also in the case where the diameter of the exhaust pipe 2a is expanded to form the substantially tapered shape at least at the part between the injection nozzle 5 and $NO_x$ reduction catalytic converter 4, as in the above, and also, at least either the fins 12 or the fins 13 are disposed in place of the partition plate 10, the same effect can be achieved.

Figure 7:
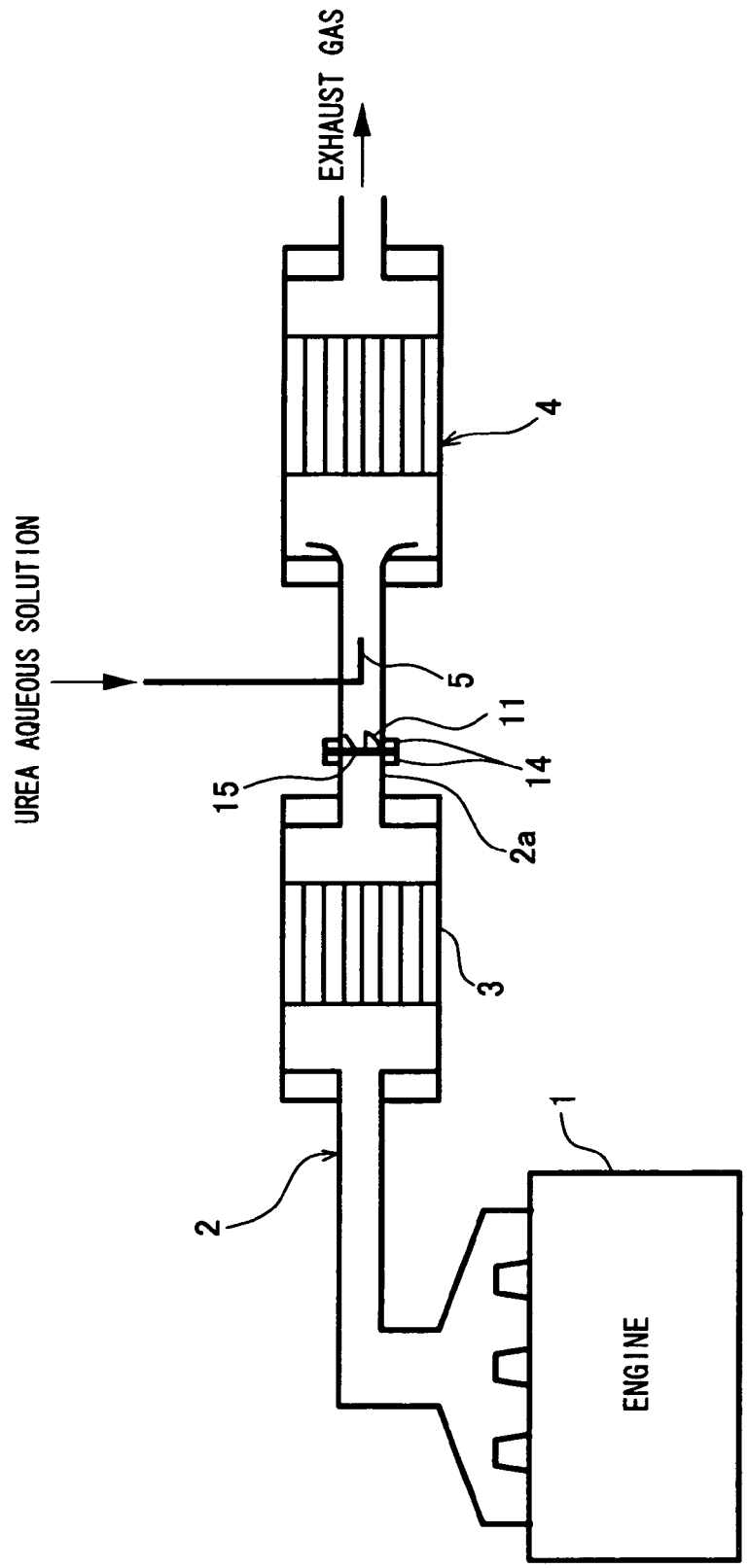
FIG. 7 is a schematic configuration diagram showing a second embodiment of the exhaust emission purifying apparatus for the engine.
Figure 8:
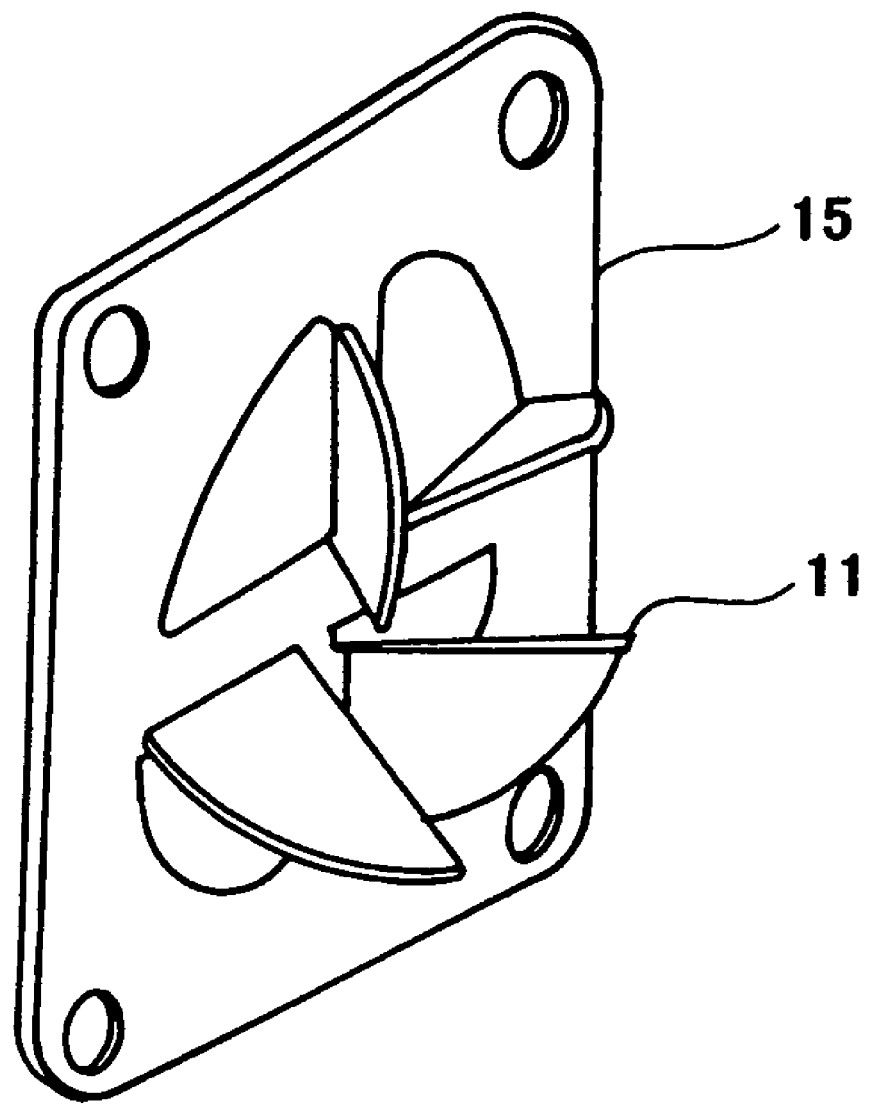
FIG. 8 is a perspective view showing a configuration example of a gasket applied to the above embodiment.

Still further, as shown in FIG. 7, when the configuration is such that the exhaust pipe 2a between the oxidation catalytic converter 3 and the injection nozzle 5 is separable in a plane orthogonal to the exhaust gas flow, and also, the divided exhaust pipes 2a are connected to each other via flanges 14, it is preferable to form the fins 11 on a gasket 15 disposed between the flanges 14. At this time, as shown in FIG. 8 for example, utilizing a center circular plate portion which is to be cut out as the exhaust passage when the gasket 15 is formed, cuts are made on the gasket 15 to be pulled up, to thereby form the plurality of fins 11 which extends at the predetermined angle with respect to the flow direction of the exhaust gas. As a result, similarly to the case where the partition plate 10 is disposed, the swirling flow is generated in the exhaust gas prior to the injection-supply of the urea aqueous solution. Accordingly, when the configuration is such that the exhaust pipe 2a divided into two within the region between the oxidation catalytic converter 3 and the injection nozzle 5 as described in the above, is connected to each other via the flanges 14, the same effect as that in the case where the partition plate 10 shown in FIG. 1 is disposed, can be readily achieved by only modifying the gasket 15, without modifying other components.

Figure 9:
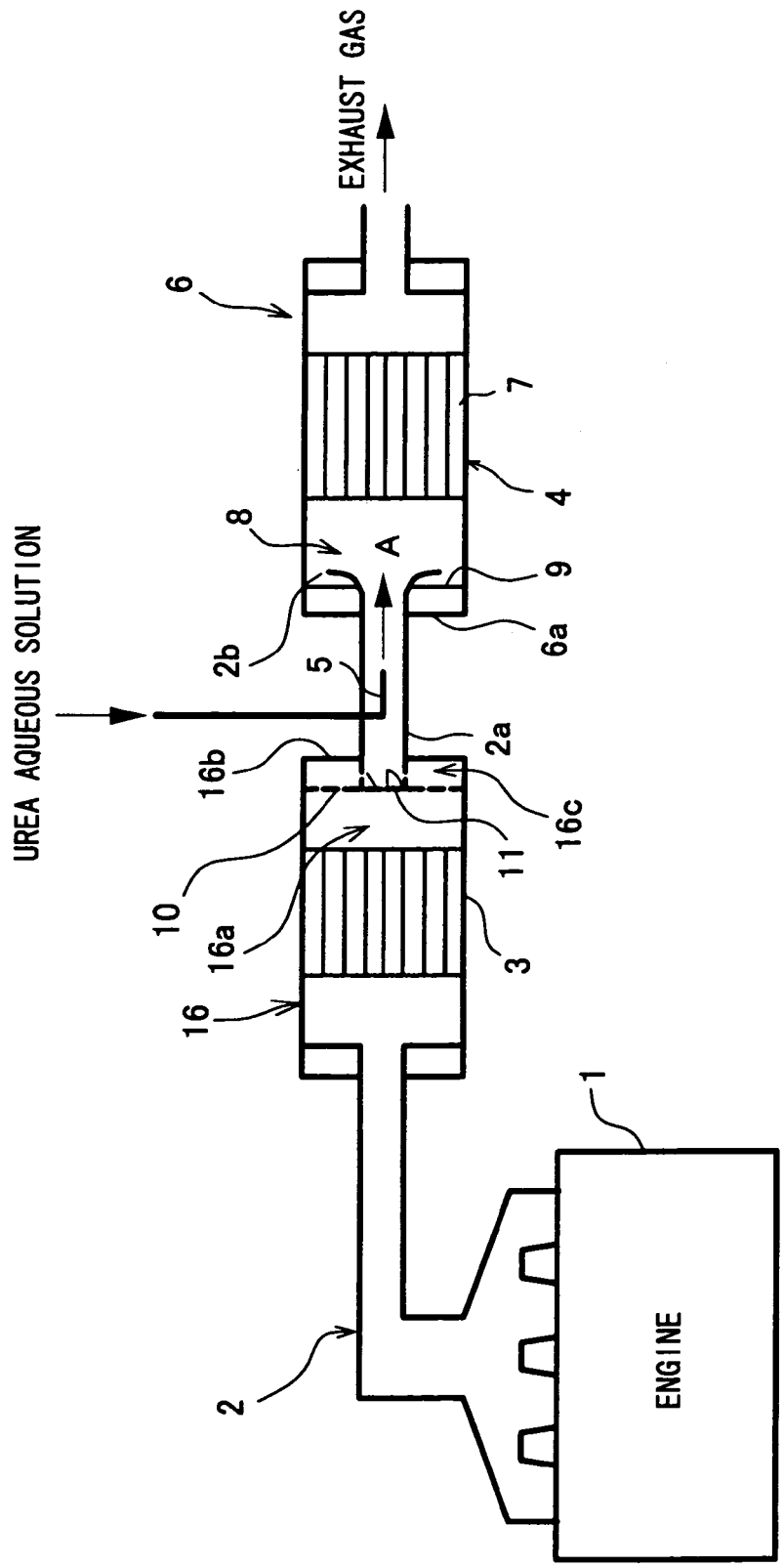
FIG. 9 is a schematic configuration diagram showing an embodiment of an exhaust emission purifying apparatus for an engine according to a second aspect of the present invention.

Next, there will be described an exhaust emission purifying apparatus for an engine according to a second aspect of the present invention, referring to FIG. 9 through FIG. 13. FIG. 9 is a schematic configuration diagram showing an embodiment of the exhaust emission purifying apparatus for the engine according to this aspect. This exhaust emission purifying apparatus comprises: a reduction catalytic converter disposed in an exhaust passage of the engine, for reductively purifying nitrogen oxides in the exhaust gas with a reducing agent; an injection nozzle for injection-supplying the reducing agent to an exhaust upstream side of the reduction catalytic converter in the exhaust passage; a partition plate disposed on an exhaust upstream side of the injection nozzle to traverse the exhaust passage, which is provided with, on a center portion thereof, swirling flow generating means for generating the swirling flow which spirally swirls, in the exhaust gas passing through the exhaust passage, and is provided with discharge holes which are formed in scattered in a peripheral region of the swirling flow generating means to flow out the exhaust gas to a downstream side; and a coupling exhaust pipe constituting a part of the exhaust passage, which is jointed to the partition plate while incorporating the swirl-flow generating means therein, and is formed with, on a side face thereof in the vicinity of the swirl-flow generating means, exhaust gas introduction holes for introducing the exhaust gas flowed out from the discharge holes of the partition plate into the coupling exhaust pipe.

Generally, the exhaust gas of the engine 1 which uses a gasoline or diesel oil as fuel is emitted into the atmosphere via the exhaust pipe 2 served as the exhaust passage. In detail, in the exhaust pipe 2, there are disposed the oxidation catalytic converter 3 for nitrogen monoxide (NO) and the $NO_x$ reduction catalytic converter 4 as the reduction catalytic converter in this order from the exhaust upstream side.

The oxidation catalytic converter 3 is for oxidizing NO in the exhaust gas passing through the exhaust pipe 2 with the oxidation reaction to generate $NO_2$, and is formed such that a honeycomb type catalyst supporting precious metal, such as platinum, on a surface thereof formed of a porous material, such as alumina, is disposed to a monolith type catalyst carrier which is formed of a material having high heat resistance properties and high anti-corrosion characteristics, for example, cordierite ceramics, stainless steel or the like, and has a cross section of honeycomb shape. Then, the oxidation catalytic converter 3 is placed in a substantially cylindrical case 16 formed to have a diameter larger than that of the exhaust pipe 2, and when the exhaust gas passing through the exhaust pipe 2 is flowed while being contact with the catalyst in a catalyst shell, subjects NO in the exhaust gas to the oxidation reaction (combustion) to change it into $NO_2$, to thereby improve a $NO_x$ elimination rate in the $NO_x$ reduction catalytic converter 4 on the downstream side. Incidentally, at the same time of the oxidation reaction of NO, hydrocarbon (HC), carbon monoxide (CO) and the like in the exhaust gas are also decreased with the oxidation reaction.

Figure 10:
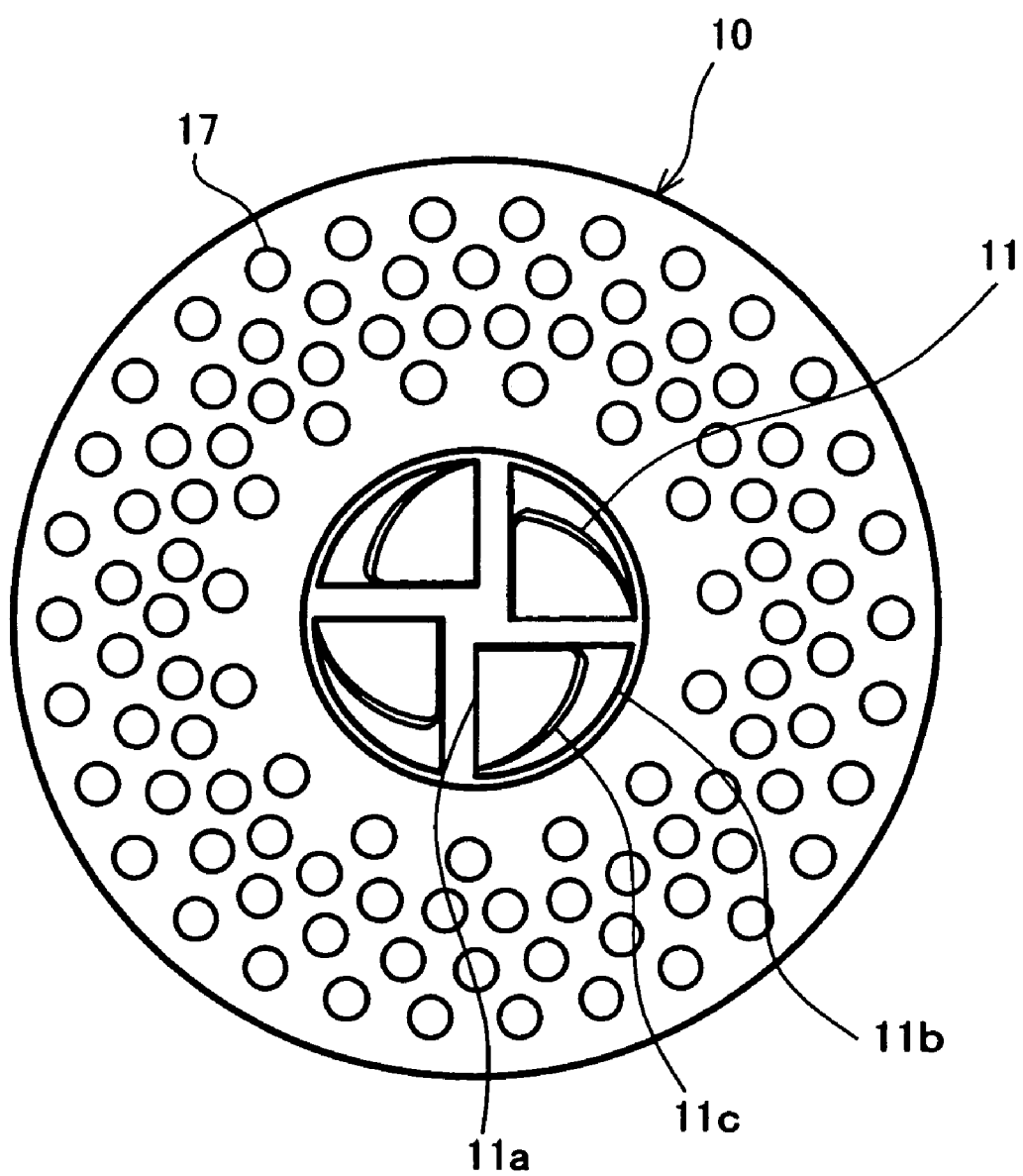
FIG. 10 is a plan view showing a configuration example of a partition plate applied to the above embodiment.
Figure 11:
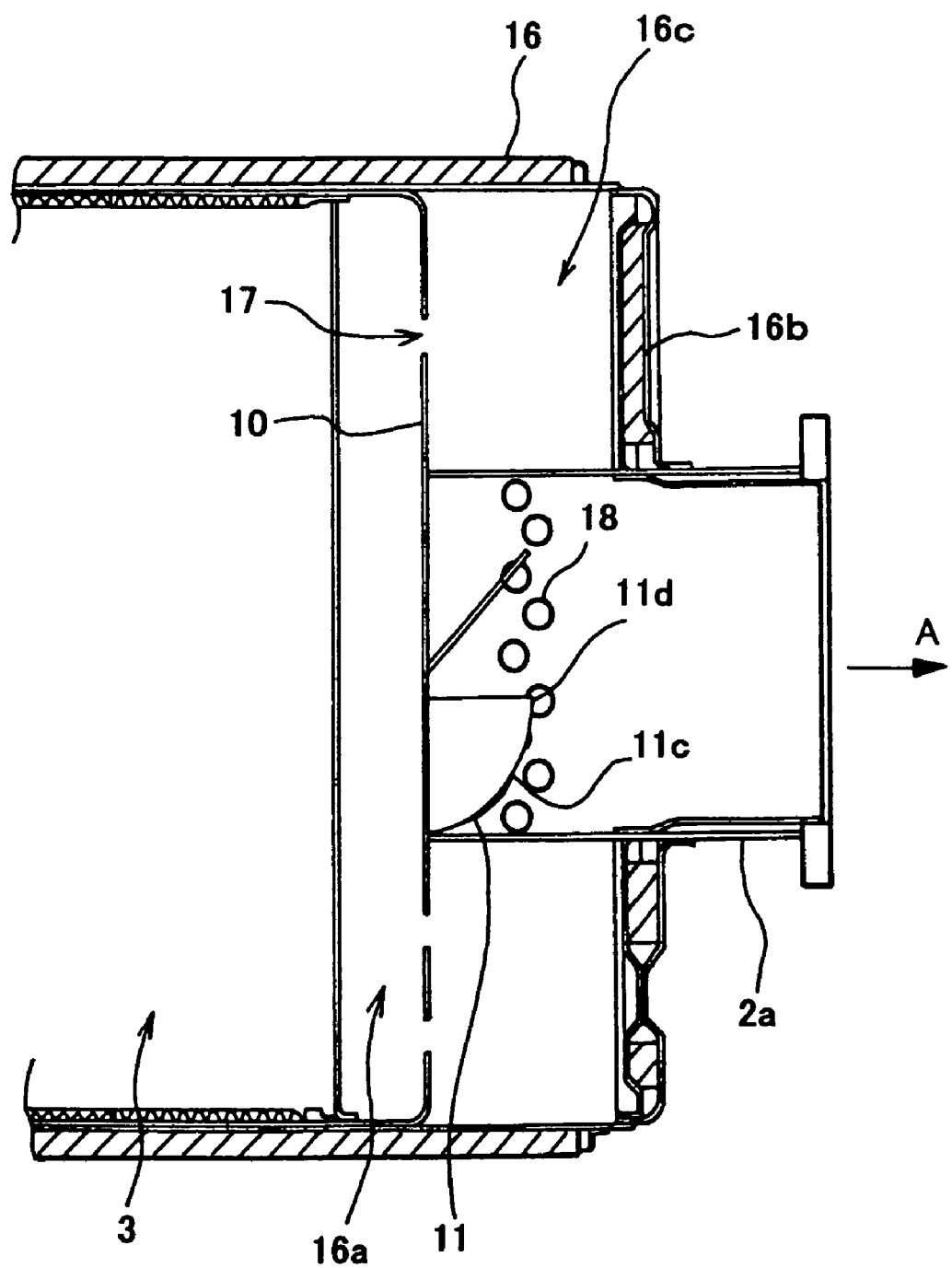
FIG. 11 is a cross section view showing, in an enlarged scale, a portion of a case of an oxidation catalytic converter in the above embodiment.

Further, in the case 16, on an exhaust downstream side thereof, the circular partition plate 10 having an outer shape substantially equivalent to an inner diameter of the case is mounted to traverse the case 16, and connects thereto the coupling exhaust pipe 2a which is connected to the case 6 which places therein the NOx reduction catalytic converter 4, to communicate the space 16a in the case 16 with the space 8 in the case 6, thereby ensuring a passage of the exhaust gas. As shown in FIG. 10, the plurality of fins 11 (e.g., four fins, as shown in FIG. 10) is formed on the center portion of the partition plate 10, as the swirl-flow generating means for generating the helical swirling flow in the exhaust gas with the center thereof corresponding to the center axis of the coupling exhaust pipe 2a, and the discharge holes 17 are formed in scattered in the peripheral region of the fins 11. Incidentally, each fin 11 is formed in a substantially propeller shape, by making a cut 11b of a substantially hook shape so that a side extending in an orthogonal direction to the center portion of the partition plate 10 becomes a folding line, as shown in FIG. 10, and by folding an outer edge portion 11c thereof toward the exhaust downstream (shown by an arrow A in the figure) by a predetermined angle, and as shown in FIG. 11, so that the swirling flow is generated in the exhaust gas. The number and the angle of the fin 11 is appropriately set based on the specification of the engine 1, the inner diameter of the coupling exhaust pipe 2a, the inner diameter of the case 16 and the like.

Furthermore, on the side face of the coupling exhaust pipe 2a, as shown in FIG. 11, exhaust gas introduction holes 18 are formed in the vicinity of tip ends 11d of the fins 11, so that the exhaust gas flowed out from the discharge holes 17 of the partition plate 10 can be introduced through the exhaust gas introduction holes 18 to the vicinity of the tip ends 11d of the fins 11 in the coupling exhaust pipe 2a. As shown in FIG. 12A, it is preferable to form the exhaust gas introduction holes 18 so that exhaust upstream side end portions 18a thereof are positioned on an exhaust upstream side of the tip ends 11d of the fins 11.

In the case 6 for the $NO_x$ reduction catalytic converter, which is coupled with the case 16 for the oxidation catalytic converter 3 via the coupling exhaust pipe 2a, the $NO_x$ reduction catalytic converter 4 is placed therein. The $NO_x$ reduction catalytic converter 4 is for reductively purifying $NO_x$ in the exhaust gas passing through the exhaust pipe 2 with the reducing agent, and is formed such that a zeolitic active component is supported on a monolith type catalyst carrier which is formed of cordierite ceramics or a heat-resistance steel of Fe—Cr—Al series for example, and has a cross section of honeycomb shape. In the $NO_x$ reduction catalytic converter 4, the active gradient supported on the catalyst carrier is supplied with the reducing agent to be activated, to thereby effectively purify $NO_x$ in the exhaust gas into harmless substances. Incidentally, the case 6 is in a substantially cylindrical shape formed larger than the diameter of the exhaust pipe 2.

Further, in the case 6, the circular fixing plate 9 having an outer shape substantially equivalent to the inner diameter of the case 6 is provided on the exhaust upstream side of the $NO_x$ reduction catalytic converter 4, to traverse the case 6. The circular fixing plate 9 is formed with an opening at a center portion thereof, so as to fix to the opening the coupling exhaust pipe 2a communicated with the case 16 of the oxidation catalytic converter 3. Then, the diameter of the edge portion 2b of the coupling exhaust pipe 2a is expanded in the bell-mouth shape toward the exhaust downstream side (in arrow A direction).

Incidentally, on the latter stage of the $NO_x$ reduction catalytic converter 4, an oxidation catalytic converter for ammonia-slip (not shown in the figure) is disposed, which oxidizes ammonia which has not been treated in the $NO_x$ reduction catalytic converter 4, to make it odor-free thereby discharging it.

Furthermore, on the upstream side of the $NO_x$ reduction catalytic converter 4 in the coupling exhaust pipe 2a, the injection nozzle 5 is disposed, so that the reducing agent is injection-supplied together with the pressurized air via the injection nozzle 5 to the inside of the coupling exhaust pipe 2a from a reducing agent supply device (not shown in the figure). Here, the injection nozzle 5 is set such that a tip end portion thereof is made to extend toward the downstream side substantially in parallel to the flow direction (arrow A direction) of the exhaust gas. However, the tip end portion of the injection nozzle 5 may be set to protrude in substantially orthogonal to the flow direction of the exhaust gas in the coupling exhaust pipe 2a.

The reducing agent, for example, the urea aqueous solution, injection-supplied from the injection nozzle 5 is hydrolyzed due to the exhaust heat in the coupling exhaust pipe 2a and the water vapor in the exhaust gas, to easily generate ammonia. Obtained ammonia reacts with $NO_x$ in the exhaust gas, in the $NO_x$ reduction catalytic converter 4, to thereby purify $NO_x$ into the water and the harmless gas. Note, the reducing agent is not limited to the urea aqueous solution, and for example, the ammonia aqueous solution or the like may be used as the reducing agent.

Next, there will be described an operation of the exhaust emission purifying apparatus for the engine, configured as described above.

The exhaust gas which is discharged due to the starting of the operation of the engine 1, passes through the exhaust pipe 2 and flows into the oxidation catalytic converter 3. And then, NO in the exhaust gas is oxidized by the oxidation-reaction to be converted into $NO_2$ with the oxidation catalytic converter 3. The exhaust gas containing $NO_2$ is swirled by the fins 11 of the partition plate 10 disposed in the case 16, to become the swirling flow, and is flowed through the coupling exhaust pipe 2a in the arrow A direction.

Simultaneously with the above, the urea aqueous solution is injection-supplied from the injection nozzle 5 into the coupling exhaust pipe 2a toward the arrow A direction. The urea aqueous solution injection-supplied from the injection nozzle 5 is hydrolyzed due to the exhaust heat and the water vapor in the exhaust gas to generate ammonia. Obtained ammonia and the exhaust gas are flowed into the $NO_x$ reduction catalytic converter 4 while being mixed with each other. Then, in the $NO_x$ reduction catalytic converter 4, ammonia and $NO_x$ in the exhaust gas react with each other, so that $NO_x$ in the exhaust gas is purified into the water and the harmless gas.

In this case, since the urea aqueous solution is injection-supplied into the swirling flow in the exhaust gas, the mixing of the urea aqueous solution with the exhaust gas is promoted. As a result, the hydrolysis of the urea aqueous solution is promoted, and also, the exhaust gas and ammonia generated from the urea aqueous solution are mixed with each other substantially uniformly. Further, since the diameter of the edge portion 2b of the coupling exhaust pipe 2a is expanded in the bell-mouth shape, the swirled exhaust gas is rapidly diffused from the edge portion 2b into the space 8 in the case 6 on the exhaust upstream side of the $NO_x$ reduction catalytic converter 4, while being diffused along an inner wall of the edge portion 2b, whose diameter is expanded in the bell-mouth shape, of the coupling exhaust pipe 2a. As a result, the exhaust gas with which ammonia is substantially uniformly mixed is flowed into the $NO_x$ reduction catalytic converter 4 substantially uniformly, so that the purification of the exhaust gas in the $NO_x$ reduction catalytic converter 4 is further promoted.

Moreover, a part of the exhaust gas flowed out from the oxidation catalytic converter 3 is flowed from the discharge holes 17 formed on the partition plate 10 shown in FIG. 11, into a space 16c surrounded by the partition plate 10 and a side face 16b of the case 16, and further, is introduced from the exhaust gas introduction holes 18 formed on the side face of the coupling exhaust pipe 2a into the coupling exhaust pipe 2a in the vicinity of the tip ends 11d of the fins 11. As a result, the exhaust gas is not concentrated to the fin 11 portion, but the part thereof is dispersed to be flowed out from the discharge holes 17 to be flowed into the coupling exhaust pipe 2a through the exhaust gas introduction holes 18. Therefore, the exhaust gas resistance is decreased.

Figure 13A:
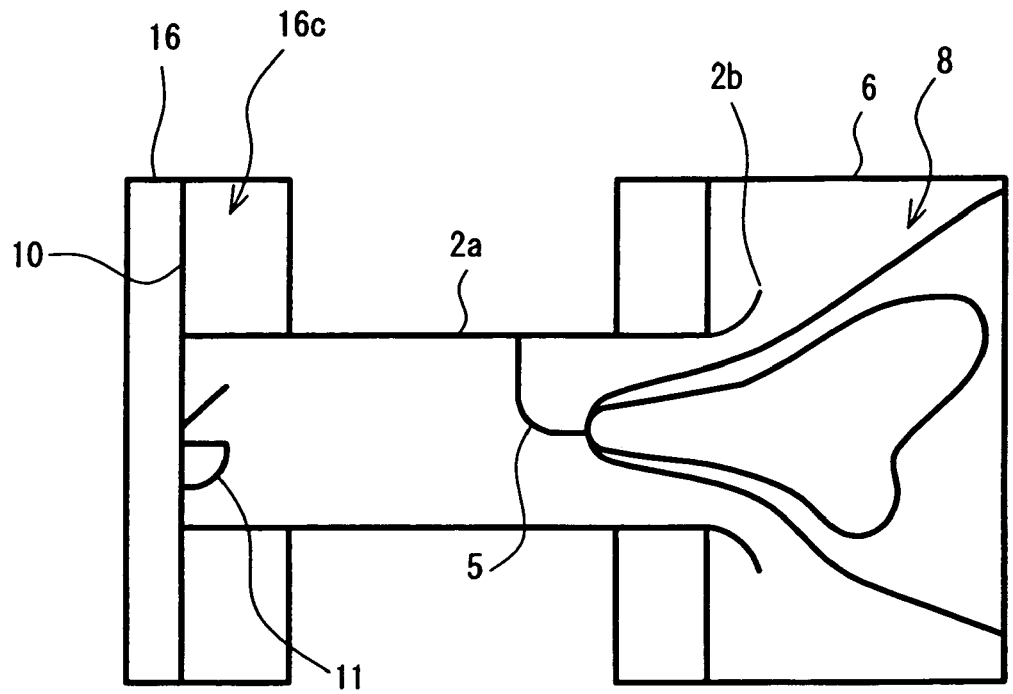
FIG. 13 is an explanatory diagram showing a diffusion state of a urea aqueous solution injection-supplied from an injection nozzle in the respective positional relations in FIG. 12, in which 13A shows the case of the positional relation in FIGS. 12A, and 13B shows the case of the positional relation in FIG. 12B.

In this case, as shown in FIG. 12A, an exhaust upstream side end portion 18a of each of the exhaust gas introduction holes 18 is formed to be positioned on an exhaust upstream side of the tip end 11d of each of the fins 11. Therefore, the swirling flow of the exhaust gas generated by the fins 11 is hardly disturbed at all by the exhaust gas introduced through the exhaust gas introduction holes 18. FIG. 13A shows an embodiment in the case of the positional relation in FIG. 12A, provided that an interval Δa from the tip end 11d of each of the fins 11 to the exhaust upstream side end portion 18a of each of the exhaust gas introduction holes 18 is made -2.5 mm. According to this structure, the swirling flow in the exhaust gas is maintained, and the urea aqueous solution injected from the injection nozzle 5 is widely diffused to be flowed into the $NO_x$ reduction catalytic converter 4 substantially in even.

Figure 13B:
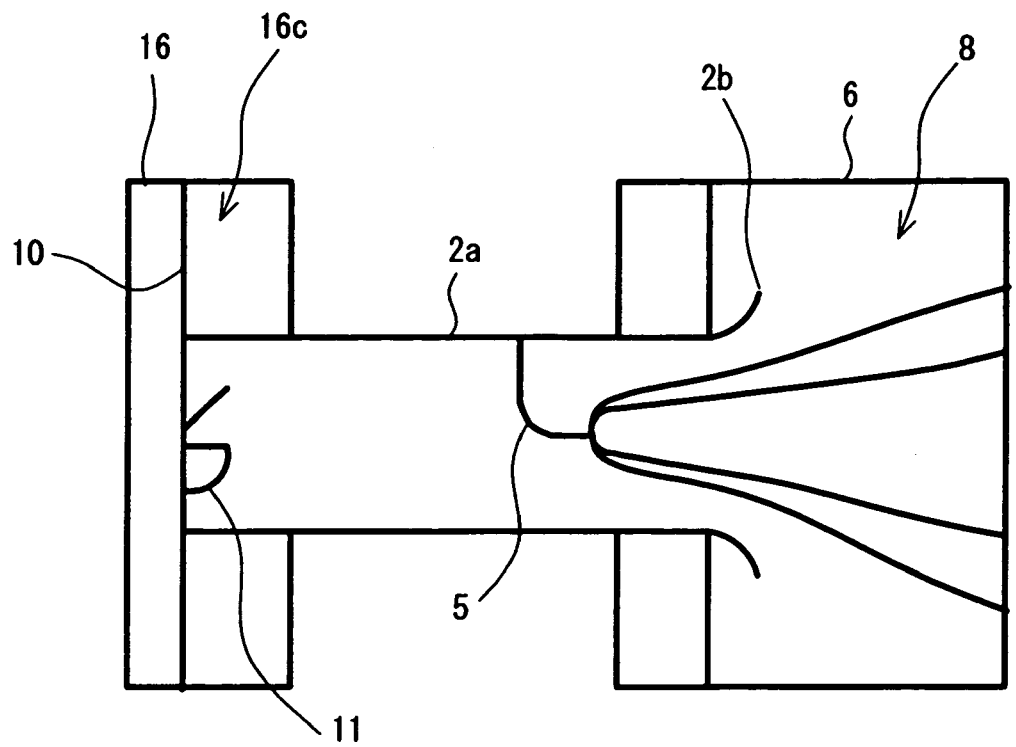

On the other hand, as shown in FIG. 12B, in the case where the exhaust upstream side end portion 18a of each of the exhaust gas introduction holes 18 is formed to be positioned on the exhaust downstream side by an interval Δb from the tip end 11d of each of the fins 11, the swirling flow in the exhaust gas is suppressed by the exhaust gas introduced from the exhaust gas introduction holes 18, as shown in FIG. 13B, so that the diffusion of the urea aqueous solution injected from the injection nozzle 5 is suppressed. Note, FIG. 13B is a reference example for the case of the positional relation in FIG. 12B, in which the interval Δb is made to be +13.2 mm. Thus, if the exhaust upstream side end portion 18a of each of the exhaust gas introduction holes 18 is made to be positioned on the exhaust upstream side of the tip end 11d of each of the fins 11, the swirling flow in the exhaust gas is maintained.

As in the above manner, according to the exhaust emission purifying apparatus for the engine according to the second aspect of the present invention, the fins 11 are formed on the center portion of the partition plate 10 which is disposed to traverse the case 16 of the oxidation catalytic converter 3, to thereby generate, in the exhaust gas, the swirling flow which spirally swirls, and the discharge holes 17 are disposed in scattered in the peripheral region of the fins 11 of the partition plate 10 and also the exhaust gas introduction holes 18 are formed on the side face of the coupling exhaust pipe 2a, which is joined to the partition plate 10 while including therein the fins 11, and further, the part of the exhaust gas is made to pass through the discharge holes 17 and the exhaust gas introduction holes 18 to be introduced to the vicinity of the tip ends 11d of the fins 11, so that the exhaust gas resistance can be decreased while maintaining the swirling flow in the exhaust gas, which is generated by the fins 11. Accordingly, it is possible to promote the mixing of the urea aqueous solution injected from the injection nozzle 5 with the exhaust gas, and also it is possible to promote the diffusion of the urea aqueous solution to thereby flow the exhaust gas into the $NO_x$ reduction catalytic converter 4 substantially uniformly, thereby improving the exhaust gas purification efficiency.

We claim:

1. An exhaust emission purifying apparatus for an engine, comprising:

a reduction catalytic converter disposed in an exhaust passage of said engine, for purifying nitrogen oxides contained in the exhaust gas by reduction through reacting with a reducing agent;

an injection nozzle for injection-supplying the reducing agent at a position in said exhaust passage on an exhaust upstream side of said reduction catalytic converter; and a swirl-flow generating means disposed on an exhaust upstream side of an injection position of the reducing agent in said injection nozzle, for generating, in the exhaust gas, a swirling flow which spirally swirls about a center corresponding to a central axis of said exhaust passage, wherein said swirl-flow generating means comprises a plurality of fins which is provided in said exhaust passage in a manner such that said fins extend, respectively, defining a predetermined angle with respect to a linear direction in which the exhaust gas flows from the exhaust upstream side toward an exhaust downstream side, wherein said fins are formed by pulling up a corresponding number of fin-forming portions of a thin plate of a shape substantially the same as a cross section of said exhaust passage, said fin-forming portions being defined by cuts given to said thin plate, wherein said reduction catalytic converter is formed to have a diameter thereof larger than the cross section of the exhaust passage on the exhaust upstream side thereof and on the exhaust downstream side of the swirl-flow generating means, and wherein said passage is formed such that an edge portion thereof is expanded in a bell-mouth shape increasing a diameter thereof toward the exhaust downstream side, at an exhaust gas inlet portion to said reduction catalytic converter.

2. An exhaust emission purifying apparatus for an engine, comprising:

a reduction catalytic converter disposed in an exhaust passage of said engine, for purifying nitrogen oxides contained in the exhaust gas by reduction through reacting with a reducing agent;

an injection nozzle for injection-supplying the reducing agent at a position in said exhaust passage on an exhaust upstream side of said reduction catalytic converter; and a swirl-flow generating means disposed on an exhaust upstream side of an injection position of the reducing agent in said injection nozzle, for generating, in the exhaust gas, a swirling flow which spirally swirls about a center corresponding to a central axis of said exhaust passage, wherein said swirl-flow generating means comprises a plurality of fins which is provided in said exhaust passage in a manner such that said fins extend, respectively, defining a predetermined angle with respect to a linear direction in which the exhaust gas flows from the exhaust upstream side toward an exhaust downstream side, wherein said exhaust passage is formed to be separable in a plane orthogonal to the flow on the exhaust upstream side of said injection nozzle, and wherein said fins are formed by pulling up portions of a gasket which are defined by cuts given to the gasket interposed between flanges which connect separated portions of said exhaust passage to each other.

3. An exhaust emission purifying apparatus for an engine, comprising:

a reduction catalytic converter disposed in an exhaust passage of said engine, for purifying nitrogen oxides contained in the exhaust gas by reduction with a reducing agent;

an injection nozzle for injection-supplying the reducing agent at a position in the exhaust passage on an exhaust upstream side of said reduction catalytic converter;

a partition plate disposed on an exhaust upstream side of said injection nozzle to traverse said exhaust passage, which is provided with, on a center portion thereof, a swirl-flow generating means for generating a swirling flow which spirally swirls, in the exhaust gas passing through said exhaust passage, and is provided with discharge holes which are formed in scattered manner in a peripheral region of said swirl-flow generating means, for permitting the exhaust gas to flow from an upstream side toward a downstream side via said discharge holes; and a coupling exhaust pipe which constitutes a part of said exhaust passage and is jointed to said partition plate while including said swirl-flow generating means therein, said coupling exhaust pipe being formed with, on a side face thereof in the vicinity of said swirl-flow generating means, exhaust gas introduction holes for introducing the exhaust gas flowing out of said discharge holes of said partition plate into said coupling exhaust pipe.

4. The apparatus according to claim 3, wherein said swirl-flow generating means of said partition plate comprises a plurality of fins which is formed, by making a plurality of cuts so that a side extending in radial from a center portion of said partition plate becomes a folding line, and by folding an outer edge portion of each of the cuts toward the exhaust downstream at a predetermined angle, thereby generating, in the exhaust gas, the swirling flow which spirally swirls.

5. The apparatus according to claim 4, wherein each of said exhaust gas introduction holes of said coupling exhaust pipe is formed to be positioned, at an end portion thereof on the exhaust upstream side, on the exhaust upstream side of a tip end portion of each of the fins of said swirl-flow generating means.

* * * * *